(12) United States Patent
Cook

(10) Patent No.: US 7,251,236 B1
(45) Date of Patent: Jul. 31, 2007

(54) RF ID INVENTORY PROXY FOR NETWORK MANAGEMENT

(75) Inventor: Fred S. Cook, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 569 days.

(21) Appl. No.: 10/881,882

(22) Filed: Jun. 30, 2004

(51) Int. Cl.
  *H04Q 7/24* (2006.01)
  *H04Q 7/20* (2006.01)
(52) U.S. Cl. .................. 370/338; 340/10.1; 455/424
(58) Field of Classification Search ............ None
  See application file for complete search history.

(56) References Cited

U.S. PATENT DOCUMENTS

| | | | |
|---|---|---|---|
| 6,640,253 B2 * | 10/2003 | Schaefer | 709/248 |
| 7,019,663 B2 * | 3/2006 | Sharony | 340/825.49 |
| 7,180,422 B2 * | 2/2007 | Milenkovic et al. | 340/572.4 |
| 2003/0014332 A1 | 1/2003 | Gramling | |
| 2004/0122685 A1 * | 6/2004 | Bunce | 705/1 |

OTHER PUBLICATIONS

Centennial Discovery, *The Next Generation, Network Inventory Tracking Tool*, 2003.

* cited by examiner

Primary Examiner—Erika A. Gary

(57) ABSTRACT

An RF ID tagging system provides information for managing a local area network (LAN). A plurality of first network elements and an inventory management tool are interconnected within the LAN. Predetermined management information is communicated from the first network elements to the inventory management tool via the LAN. A plurality of second network elements are maintained for coupling to the LAN, the second network elements not communicating the predetermined management information with the inventory management tool. Respective RF ID tags are mounted to each of the second network elements, wherein each of the RF ID tags wirelessly transmits a respective identifier. The respective identifiers are received in a wireless monitor. The received respective identifiers are associated with predetermined management information. Virtual device images are created in response to the predetermined management information. The virtual device images are transmitted to the inventory management tool via the LAN.

23 Claims, 5 Drawing Sheets

RF ID INVENTORY PROXY FOR NETWORK MANAGEMENT

CROSS REFERENCE TO RELATED APPLICATIONS

Not Applicable

STATEMENT REGARDING FEDERALLY SPONSORED RESEARCH

Not Applicable

BACKGROUND OF THE INVENTION

The present invention relates in general to maintaining telecommunications/computer networks, and, more specifically, to providing information to a network inventory management tool regarding network elements that are not capable of interacting with the network inventory management tool via the network.

Maintaining a reliable and efficient communications network depends upon having the ability to monitor network elements such as switches, router blades, and various types of maintenance/testing equipment. The network operator needs to detect potential problems, troubleshoot malfunctions, identify and implement corrective actions, and document resource usage and statistics. Network inventory management tools and special network protocols have been developed to assist in these functions. For TCP/IP networks, the Simple Network Management Protocol (SNMP) provides a means for monitoring and managing network elements.

Pursuant to SNMP, a Management Information Base (MIB) is maintained as a database describing the resources being managed within the network. Each SNMP-enabled network element contains an SNMP agent capable of updating predetermined management information, sometimes referred to as object variables. The inventory management tool can query the SNMP agent to discover the management information. Alternatively, the SNMP agent may automatically transmit management information to the inventory management tool in response to certain events.

Due to cost and/or processing load considerations, not all network elements that may be used in a typical managed network are SNMP-enabled. Without an SNMP communications capability, management information concerning these devices has not been available to the network inventory management tool.

A network operator may typically maintain spare (i.e., replacement) network elements to be substituted into the network when a device of that type malfunctions. In addition, there may be other network equipment that is not always interconnected with the network, such as maintenance or testing units. Whether or not these unconnected devices are SNMP-enabled, they cannot communicate with the inventory management tool when they are not connected to the network. Therefore, existing network inventory and allocation systems have not been able to track these devices or take them into account in managing the network.

SUMMARY OF THE INVENTION

The present invention has the advantage of tracking non-communicating network elements using a network inventory management tool in connection with a wireless monitoring system.

In one aspect of the invention, a method is provided for managing a local area network (LAN). A plurality of first network elements and an inventory management tool are interconnected within the LAN. Predetermined management information is communicated from the first network elements to the inventory management tool via the LAN. A plurality of second network elements are maintained for coupling to the LAN, the second network elements not communicating the predetermined management information with the inventory management tool. Respective RF ID tags are mounted to each of the second network elements, wherein each of the RF ID tags wirelessly transmits a respective identifier. The respective identifiers are received in a wireless monitor. The received respective identifiers are associated with predetermined management information. Virtual device images are created in response to the predetermined management information. The virtual device images are transmitted to the inventory management tool via the LAN.

DETAILED DESCRIPTION OF PREFERRED EMBODIMENTS

The present invention provides a mechanism that seamlessly incorporates radio frequency (RF) identification (ID) tagged equipment into network inventory management tools. Interaction of network element spares, maintenance tools, testing tools, and other network elements not adapted for direct communication with network management tools via the RF ID tagging system with the network inventory management tools allows the network resources to be located quickly and allows inventories to be managed more closely. The network elements and devices are marked with RF ID tags of the type that may be used for tagging retail merchandise in retail outlets (at the cost of about $0.25 per tag). Each ID tag provides a unique label or identifier in the form of a unique numeric code allowing the network element to be tracked with a wireless monitoring device. The RF ID identifiers are categorized and entered into the RF ID monitoring device, which is interfaced with a network proxy device. The network proxy generates virtual device images for groups of one or more RF ID identifiers. The RF ID proxy may generate individual device images for some network elements, such as specialized network analysis tools, while generating a single device image for a group of network elements that are interchangeable, such as router blades of the same type.

Device images are represented by individual network addresses and management information bases (MIBs). MIBs for device images representing multiple assets of a single type will contain an information attribute (i.e., object variable) indicating the number of occurrences available of the device type. As spare assets are used (e.g., moved onto the network or removed from the pool), the RF ID tags may be removed from the network element and the MIB attribute of number of occurrences available is decremented by one. When the asset is a specialized device such as a network analyzer, and the device leaves the location of the network (e.g., a building), the wireless signal from the RF ID tag is lost and the asset is marked as unavailable in the proxy device. Virtual device images or MIBs in the proxy are transmitted to the network inventory management tool which then can track the non-communicating network elements.

Figure 1:
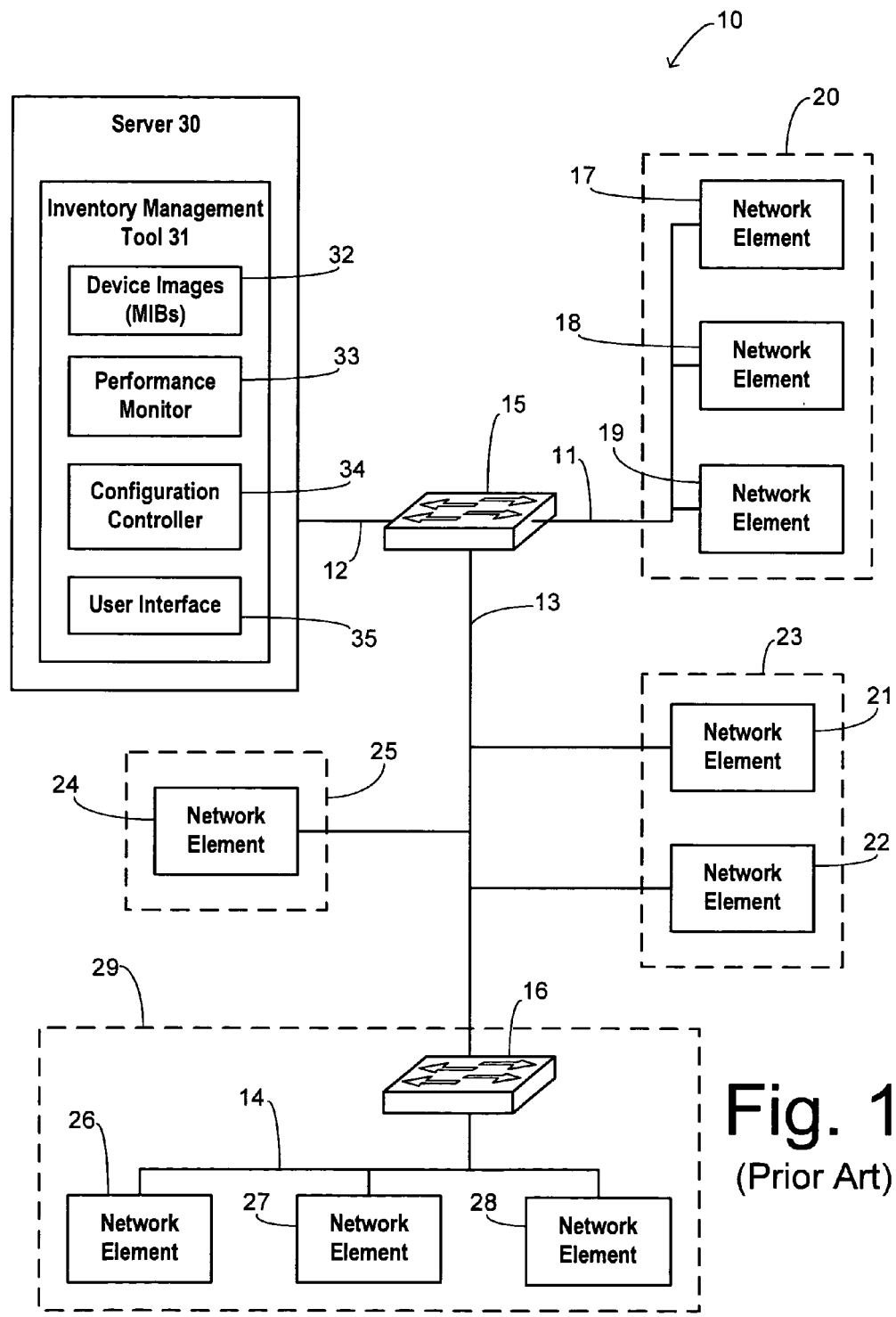
FIG. 1 is a block diagram showing a prior art managed network.

Referring to FIG. 1, a managed network 10 includes Ethernet segments 11-14 interconnected by switches 15 and 16. Ethernet segment 11 is coupled to the network elements 17, 18, and 19 which may be located in a first area or room 20. Network elements 21 and 22 in area 23 are connected to Ethernet segment 13. A network element 24 in an area 25 is also connected to segment 13. Network elements 26, 27, and 28 are interconnected by Ethernet segment 14 and connected to switch 16 in an area 29.

Ethernet segment 12 is connected to a server 30 which runs an inventory management tool 31 for providing various management functions within network 10. Depending upon the specific functionality, tool 31 includes device images or MIBs 32, a performance monitor 33, a network configuration controller 34, and a user interface 35.

Tool 31 utilizes the SNMP protocol or other similar protocol to manage each of the separate network elements that support the protocol (including switches 15 and 16). Any of the network assets not supporting the management protocol cannot be managed by tool 31. Tool 31 may be comprised of the Centennial Discovery inventory management tool available from Centennial UK Limited, for example. Using available protocols and being properly configured, tool 31 may perform hardware and software inventory functions, network device discovery, and asset location detection, among others.

Figure 2:
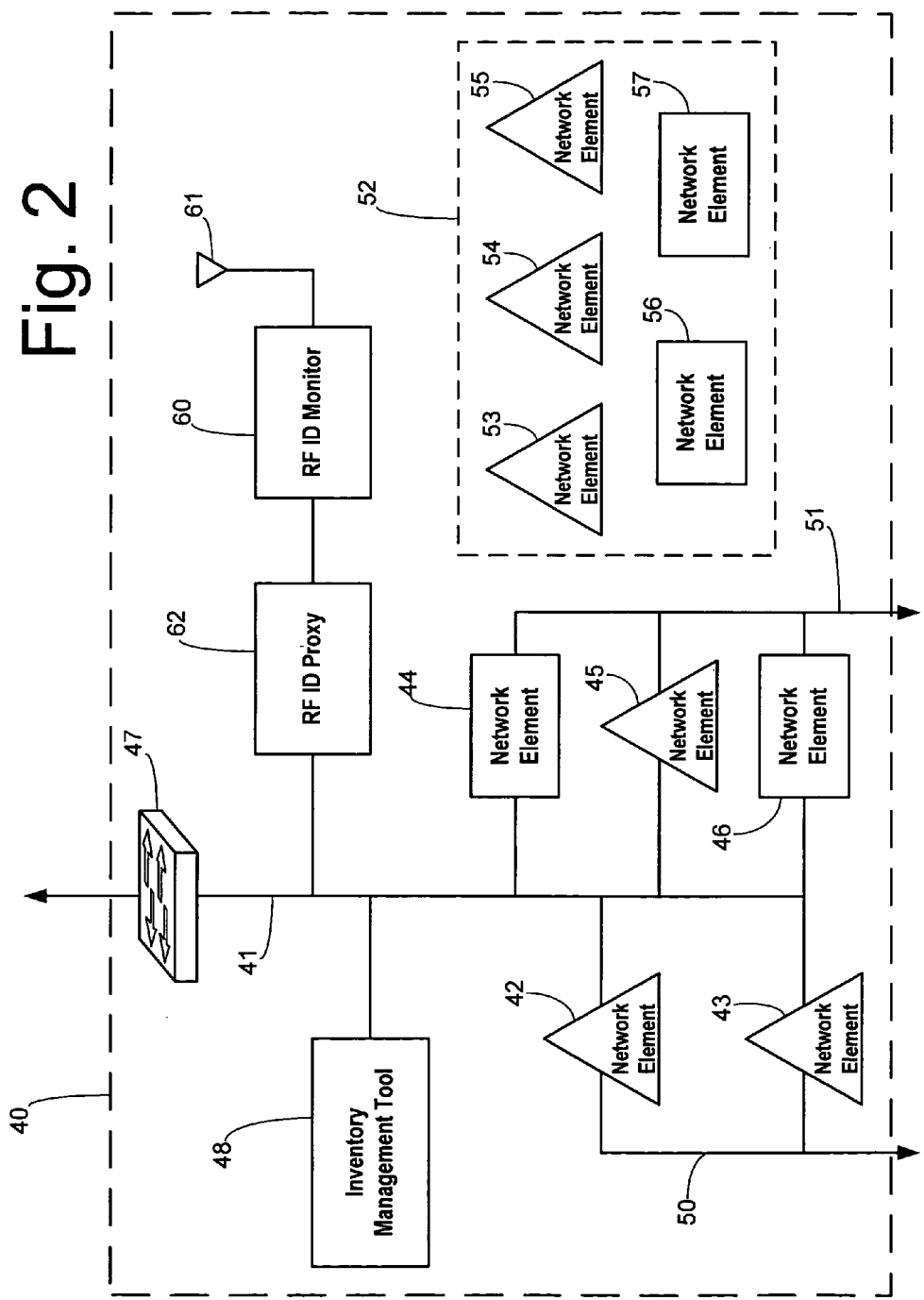
FIG. 2 is a block diagram showing a managed network of the present invention.

FIG. 2 shows a network employing the present invention wherein non-connected, spare SNMP-enabled devices and non-SNMP-enabled devices may be tracked by an inventory management tool. A network 40 includes an Ethernet segment 41 for interconnecting a local area network (LAN) including network elements 42-46 and a switch 47. An inventory management tool 48 is coupled to the LAN for managing network elements 42-46 and switch 47. In the example of FIG. 2, network elements 42 and 43 are coupled to an output channel 50 and network elements 44-46 are coupled to an output channel 51, such as in a telecommunications voice network. In this example, Ethernet segment 41 comprises the control side of the network architecture and may be coupled to a control segment of remote devices in other LANs via switch 47.

Network elements 42-46 include non-SNMP-enabled elements 42, 43, and 45 (represented by triangles) and SNMP-enabled elements 44 and 46 (represented by rectangles). A plurality of spare network elements 52 includes non-SNMP-enabled network elements 53-55 and SNMP-enabled network elements 56 and 57.

So that network elements 53-57 may be monitored and taken into account by inventory management tool 48, the present invention employs wireless RF ID tags mounted to network elements 53-57 for wirelessly communicating their presence to an RF ID monitor 60. An antenna 61 is connected to RF ID monitor 60 for a receiving wireless broadcast of identifiers from the RF ID tags. Antenna 61 may be a bi-directional transmit/receive antenna in order to allow RF ID monitor 60 to interrogate RF ID tags as desired.

RF ID monitor 60 is connected to an RF ID proxy 62 which is interfaced to network 41 for communicating with inventory management tool 48. Based on predetermined management information associated by RF ID monitor 60 with respective identifiers, RF ID proxy 62 creates virtual device images for transmission to inventory management tool 48.

Figure 3:
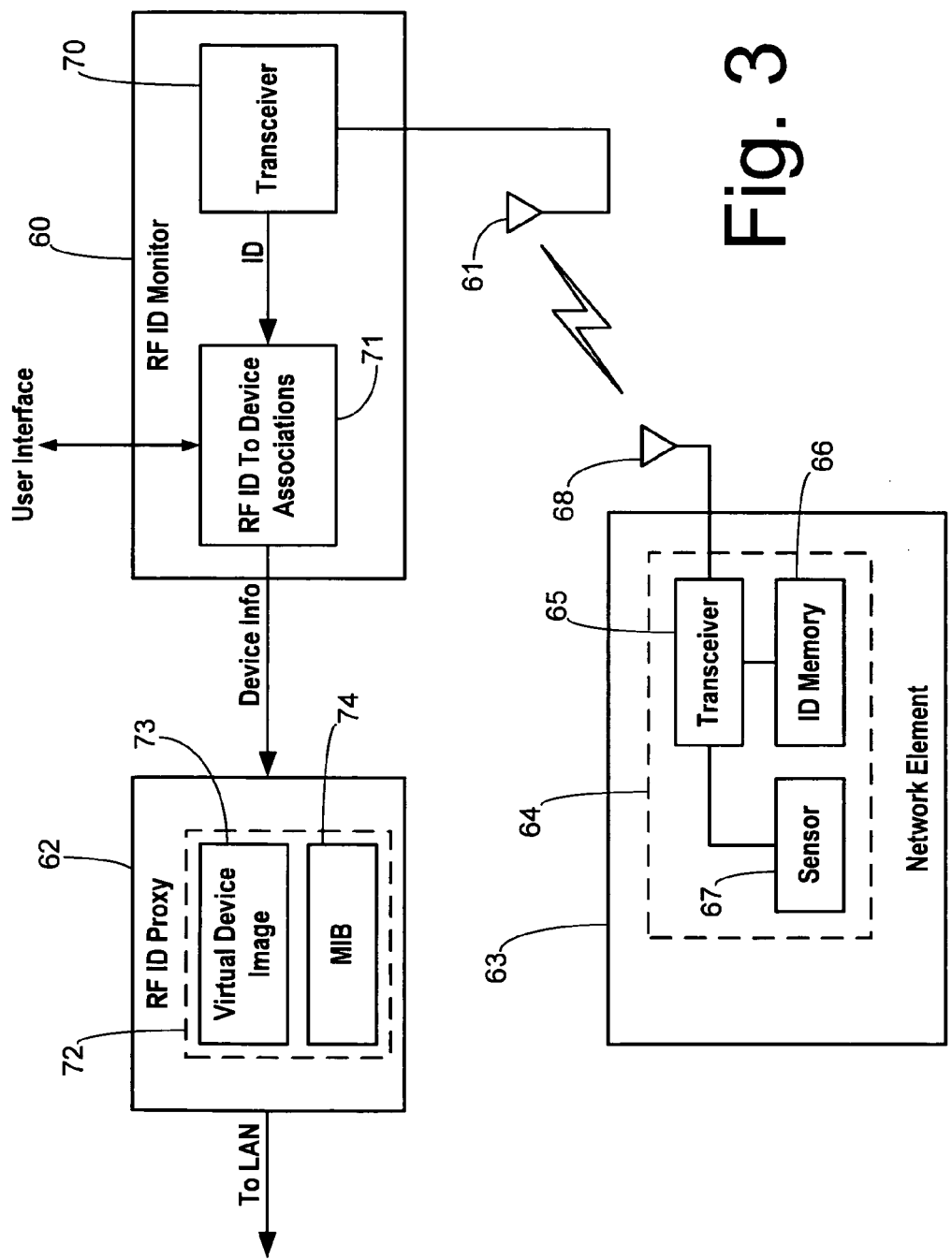
FIG. 3 is a block diagram showing the RF ID tagging system and network proxy in greater detail.

FIG. 3 shows the RF ID tagging and proxy system in greater detail. A network element 63 includes an RF ID tag 64. A transceiver 65 of RF ID tag 64 utilizes a respective identifier that is stored in an ID memory 66. In an embodiment for sensing a predetermined condition of network element 63, a sensor 67 is coupled to transceiver 65 for activating transmission of the respective identifier when the predetermined condition is detected by sensor 67. In an embodiment without a sensor, transceiver 65 may be programmed to transmit the identifier automatically on a periodic basis or in response to an interrogation signal from RF ID monitor 60. RF ID tag 64 also includes an antenna 68 for wirelessly transmitting the respective identifier to antenna 61 of RF ID monitor 60.

RF ID monitor 60 includes a transceiver 70 for detecting each respective identifier and providing it to an RF ID-to-device-associations block 71. Block 71 is configured in order to associate each respective identifier with predetermined management information corresponding to the network element to which the corresponding RF ID tag is mounted. Configuration may be performed manually via a user interface or predetermined identifiers can be assigned and stored as default network element types in block 71. Each device association may preferably include predetermined management information such as a device type, link position, physical location, and/or circuit path. In the case of providing multiple spare units of a single device type, the respective identifiers may be grouped according to at least one category of interchangeable network devices.

Respective identifiers are preferably comprised of numeric IDs, which may be stored as a binary number or a binary coded decimal representation, for example. In another embodiment, a particular category for grouping respective identifiers may correspond to a numeric range of the respective numbers so that RF ID monitor associates each respective identifier received in the numerical range with the particular interchangeable network device. For example, all identifiers from 10000 through 19999 may be associated with a particular type of router blade. When a new spare router blade is added to the pool of spares, an RF ID tag with an identifier in the range is applied to the new spare and no updating of block 71 is necessary.

Device information from block 71 corresponding to each RF ID tag detected by RF ID monitor 60 is forwarded to RF ID proxy 62. RF ID proxy 62 compiles all the device information within a virtual device image database 72. Database 72 may include a virtual device image 73 corresponding to a single instance of a network element (such as a specialized maintenance or testing tool) and a MIB 74 for tracking a plurality of interchangeable network devices of a particular category, for example.

In order to provide information concerning a predetermined condition to the network inventory management tool, sensor 67 may preferably comprise a fault sensor such as a temperature sensor for detecting a fault condition such as an over-temperature condition. When the fault condition is sensed, transceiver 65 is activated to send an identifier from ID memory 66 to transceiver 70 and on to block 71. By configuring block 71 to associate the reception of the respective identifier with the existence of the predetermined condition in the corresponding network element, the corresponding device information is sent to RF ID proxy 62 which updates a virtual device image corresponding to the faulted network element. Thereafter, information relating to the fault is transmitted to the network inventory management tool.

Figure 4:
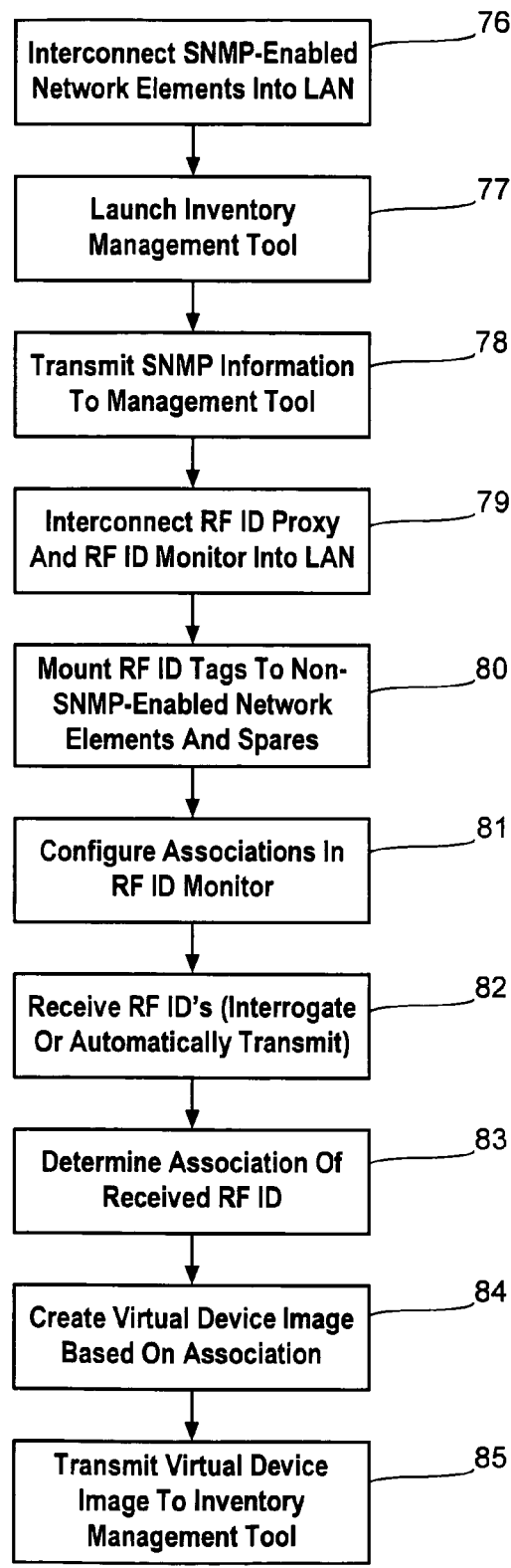
FIG. 4 is a flowchart of a preferred method of the invention.

FIG. 4 shows an overall method of the present invention in greater detail. In step 76, SNMP-enabled network elements are interconnected into the LAN. An inventory management tool is launched in step 77 and SNMP-enabled network elements transmit their SNMP information to the inventory management tool in step 78. In order to extend inventory management to additional devices that are not SNMP-enabled (whether coupled to the network or not) and network elements not connected to the network (e.g., spares), the RF ID proxy and RF ID monitor are interconnected with the LAN in step 79. RF ID tags are mounted to non-SNMP-enabled network elements and to spares in step 80. In step 81, associations in the RF ID monitor are configured based on the correspondence between respective identifiers and their devices and/or monitored conditions.

In step 82, the RF ID monitor receives RF IDs from the tags mounted to the network elements. If the RF ID tags include their own power source, then they could automatically transmit their respective identifiers according to any appropriate scheme (e.g., periodic transmission). RF ID tags could alternatively transmit their respective identifiers after being interrogated by the RF ID monitor (i.e., in response to a query from the RF ID monitor). Staggered transmissions and/or retransmissions may be utilized by the RF ID tags in order to avoid simultaneous transmissions (i.e., collisions) as is known in the art. If RF ID tags do not include their own power sources then transponders may be utilized that are energized by the query from the RF ID monitor as is known in the art.

In step 83, the RF ID monitor determines the association of a received identifier with a device identity (e.g., for a specialized testing tool), a device type (e.g., for an interchangeable device), and/or sensed predetermined condition (e.g., a device fault). A virtual device image is created or updated in step 84 based on the association. The virtual device image is transmitted by the RF ID proxy to the inventory management tool in step 85.

Figure 5:
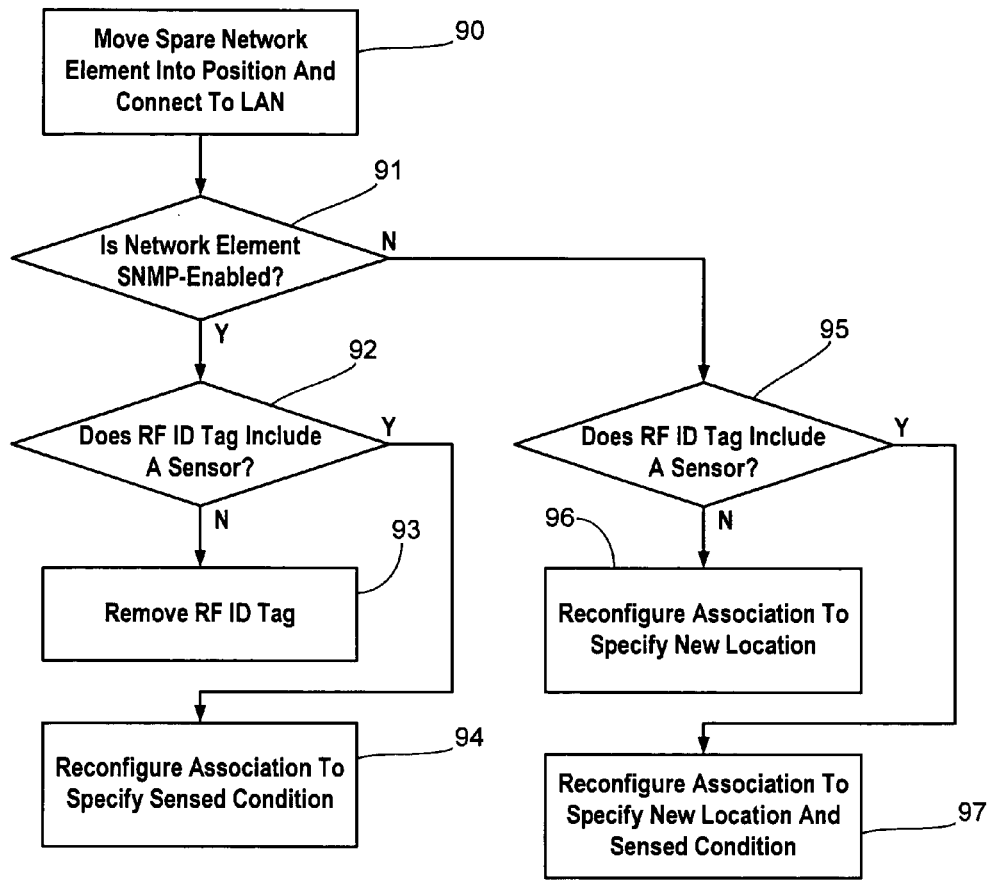
FIG. 5 is a flowchart of a preferred method for reconfiguring the RF ID tagging system when interconnecting a spare network element with the LAN.

FIG. 5 illustrates a preferred embodiment for updating a network configuration when a spare network element is used to replace an existing network element. In order to replace a network element or expand the telecommunication network, a spare network element is moved into position and connected to the LAN in step 90. A check is made in step 91 to determine whether the network element is SNMP-enabled. If it is, then a check is made in step 92 to determine whether the RF ID tag includes a sensor for sensing a predetermined condition during the time that the network element is operating in the network. If not, then the ID tag is removed in step 93. If a sensor is present, then the association for the network element stored in the RF ID monitor is reconfigured in step 94 in order to specify the sensed condition that will be present whenever the respective identifier is received.

If it is determined in step 91 that the network element is not SNMP-enabled, then a check is made in step 95 to determine whether the RF ID tag includes a sensor. If not, then the association stored in the RF ID monitor is reconfigured in step 96 to specify the new location, link position, or circuit path of the corresponding network element. If a sensor is present, then the association is reconfigured in step 97 to specify the new location of the new network element and the sensed condition that is to be detected whenever the respective identifier is received.

In an alternate embodiment, the RF ID tag is removed from any non-SNMP-enabled spare (i.e., deactivated) when the spare is placed into network service in order to allow exact knowledge of the number of spares remaining in the pool without having to reconfigure the corresponding association.

What is claimed is:

1. A method of managing a local area network (LAN), said method comprising the steps of:
   interconnecting a plurality of first network elements within said LAN;
   coupling an inventory management tool within said LAN;
   communicating predetermined management information from said first network elements to said inventory management tool via said LAN;
   maintaining a plurality of second network elements for coupling to said LAN, said second network elements not communicating said predetermined management information with said inventory management tool;
   mounting respective RF ID tags to each of said second network elements, each of said RF ID tags wirelessly transmitting a respective identifier;
   receiving said respective identifiers in a wireless monitor;
   associating said received respective identifiers with predetermined management information;
   creating virtual device images in response to said predetermined management information; and
   transmitting said virtual device images to said inventory management tool via said LAN.

2. The method of claim 1 further comprising the step of:
   grouping said respective identifiers according to at least one category of interchangeable network devices.

3. The method of claim 2 wherein said respective identifiers are comprised of respective numbers and wherein said category corresponds to a numerical range of said respective numbers.

4. The method of claim 1 wherein said RF ID tags transmit said respective identifiers substantially continuously.

5. The method of claim 1 further comprising the step of:
   said wireless monitor interrogating said RF ID tags to cause said RF ID tags to transmit said respective identifiers.

6. The method of claim 1 wherein a sensor is coupled to a particular second network element and a respective RF ID tag mounted to said particular second network element for sensing a predetermined condition of said respective second network element, wherein said particular second network element is coupled within said LAN, and wherein said respective RF ID tag transmits said respective identifier in response to sensing said predetermined condition.

7. The method of claim 6 wherein said sensor comprises a fault sensor and wherein said predetermined condition comprises a fault condition.

8. The method of claim 7 wherein said fault sensor is comprised of a temperature sensor and wherein said fault condition is comprised of an over-temperature condition.

9. Local area network (LAN) apparatus comprising:
   an inventory management tool coupled within said LAN;
   a plurality of first network elements coupled within said LAN and communicating predetermined management information with said inventory management tool;
   a plurality of second network elements for coupling to said LAN, said second network elements not communicating said predetermined management information with said inventory management tool;

a plurality of RF ID tags each mounted to a respective one of said second network elements and wirelessly transmitting a respective identifier;

a wireless monitor receiving said respective identifiers, said wireless monitor being configured to associate said respective identifiers with said predetermined management information; and a network proxy device coupled to said LAN and to said wireless monitor for creating virtual device images corresponding to said respective identifiers received by said wireless monitor and for transmitting said virtual device images to said inventory management tool.

10. The apparatus of claim 9 wherein said second network elements lack a capability to communicate said predetermined management information to said inventory management tool after being coupled to said LAN.

11. The apparatus of claim 10 further comprising a sensor coupled to a particular second network element and a respective RF ID tag mounted to said particular second network element for sensing a predetermined condition of said respective second network element, wherein said particular second network element is coupled within said LAN, and wherein said respective RF ID tag transmits said respective identifier in response to sensing said predetermined condition.

12. The apparatus of claim 11 wherein said sensor comprises a fault sensor and wherein said predetermined condition comprises a fault condition.

13. The apparatus of claim 12 wherein said fault sensor is comprised of a temperature sensor and wherein said fault condition is comprised of an over-temperature condition.

14. The apparatus of claim 9 wherein said predetermined management information comprises a network device type.

15. The apparatus of claim 9 wherein said predetermined management information comprises a network device location.

16. The apparatus of claim 9 wherein said predetermined management information comprises a network device circuit path.

17. The apparatus of claim 9 wherein said predetermined management information comprises a number of instances of a network device type.

18. The apparatus of claim 9 wherein said virtual device images are comprised of a management information base (MIB).

19. The apparatus of claim 9 wherein said association of said respective identifiers with said predetermined management information includes providing categories for grouping said respective identifiers.

20. The apparatus of claim 19 wherein said respective identifiers are comprised of respective numbers and wherein at least one of said categories corresponds to a numerical range of said respective numbers.

21. The apparatus of claim 19 wherein said categories include a category of interchangeable network devices.

22. The apparatus of claim 9 wherein said RF ID tags transmit said respective identifiers substantially continuously.

23. The apparatus of claim 9 wherein said wireless monitor interrogates said RF ID tags to cause said RF ID tags to transmit said respective identifiers.

* * * * *